(12) United States Patent
Stecklein

(10) Patent No.: US 7,744,499 B2
(45) Date of Patent: Jun. 29, 2010

(54) HYDRO-MECHANICAL TRANSMISSION

(75) Inventor: Gary Lee Stecklein, San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 511 days.

(21) Appl. No.: 11/656,818

(22) Filed: Jan. 22, 2007

(65) Prior Publication Data

US 2008/0176699 A1      Jul. 24, 2008

(51) Int. Cl.
*F16H 47/04* (2006.01)
(52) U.S. Cl. .............................. 475/72; 475/78; 475/80
(58) Field of Classification Search .................... 475/72, 475/76, 78, 80, 83
See application file for complete search history.

(56) References Cited

U.S. PATENT DOCUMENTS

| | | | | |
|---|---|---|---|---|
| 3,709,060 A | 1/1973 | Orshansky, Jr. | ............... | 74/687 |
| 3,763,978 A | 10/1973 | Crooks | ........................ | 192/4 A |
| 4,382,392 A | 5/1983 | Meyerle et al. | ............... | 74/687 |
| 4,778,020 A | 10/1988 | Hagin et al. | ................ | 180/53.4 |
| 4,813,510 A | 3/1989 | Lexen | ......................... | 180/165 |
| 4,959,962 A | 10/1990 | Hagin et al. | .................. | 60/626 |
| 5,643,121 A * | 7/1997 | Greenwood et al. | ........... | 475/72 |
| 6,402,660 B1 | 6/2002 | Cronin et al. | .................. | 477/68 |
| 7,241,242 B2 * | 7/2007 | Schmidt | ....................... | 475/72 |
| 7,303,498 B2 * | 12/2007 | Ishii et al. | ...................... | 475/72 |
| 7,335,125 B2 * | 2/2008 | McCrary | ....................... | 475/72 |
| 7,416,502 B2 * | 8/2008 | Ulbrich | ........................ | 475/72 |
| 2005/0043133 A1 | 2/2005 | Weeramantry | ................ | 475/72 |

* cited by examiner

*Primary Examiner*—Ha D. Ho
(74) *Attorney, Agent, or Firm*—O'Keefe, Egen et al.

(57) ABSTRACT

A hydro-mechanical transmission system. The system includes an engine having a drive shaft that extends into and supplies power to a gear box having a first and second planetary gear set, wherein the first and second planetary gear set includes a sun with a first ring gear fixed and a carrier coupled to the drive shaft through a double clutch, a hydraulic pump driven by the engine and hydraulically coupled to a hydraulic motor, a low pressure accumulator coupled to the motor and the pump, a high pressure accumulator coupled to the motor and the pump, wherein the hydraulic motor couples to the suns of both planetary gear sets, wherein the engine drives the carrier of the second planetary gear set with the ring of the second planetary gear set coupled to the drive shaft through a double clutch.

18 Claims, 3 Drawing Sheets

HYDRO-MECHANICAL TRANSMISSION

BACKGROUND OF THE INVENTION

This application pertains to a hydro-mechanical transmission that incorporates synchronized shifting and hydraulic energy recovery.

Transmissions have been used to extend the speed-torque envelope of an engine to achieve motive power. Recently, hybrid electric and hybrid hydraulic transmissions have been developed to allow vehicle kinetic energy to be recovered and reused by the vehicle.

There is much research directed to this area, and improvements in this technology are desirable.

SUMMARY OF INVENTION

This invention provides a solution to one or more of the problems and/or disadvantages discussed above.

In one embodiment, this invention is a hydro-mechanical transmission system, comprising: an engine having a drive shaft that extends into and supplies power to a gear box having a first and second planetary gear set, wherein the first and second planetary gear set includes coupled suns with a first ring gear fixed and a carrier coupled to the drive shaft through a double clutch, a hydraulic pump driven by the engine and hydraulically coupled to a hydraulic motor, a low pressure accumulator coupled to the motor and the pump, a high pressure accumulator coupled to the motor and the pump, wherein the hydraulic motor couples to the suns, wherein the engine drives the carrier of the second planetary gear set with the ring of the second planetary gear set coupled to the drive shaft through a double clutch. In additional embodiments, the first and second planetary gear set includes gear ratios that are configured to provide synchronized shifting when the pump to motor displacement ratio is equal to the displacement ratio that exists when the pump is at maximum displacement and the motor is at minimum displacement; the system is adapted to provide recovery of brake energy in first gear by taking the pump to zero displacement and taking the motor over center to pump fluid from the low pressure accumulator into the high pressure accumulator; the system is adapted to recover brake energy in second gear by taking the pump and motor over cent to pump fluid from the low pressure accumulator into the high pressure accumulator; the system is adapted to provide acceleration by displacing the motor to provide motive torque; and/or the system is adapted to start the engine using the hydraulic pump.

As used herein, an engine refers to an internal combustion engine, such as a gasoline, diesel, or HCCI engine. The drive shaft couples in a conventional manner to provide power to the wheels of the vehicle. In one embodiment, the gear box is a two speed gear box. In one embodiment, the motor and engine drive the same drive shaft. The system is adapted so that in one condition only the hydraulic motor applies power initially, in a second condition the engine provides power to supply energy to the pump and to the drive shaft such that constant power output is realized, in a third condition power is supplied to the shaft by both the engine and hydraulically, synchronous shifting occurs to provide power from the engine sufficient to power the drive shaft and to take the pump from maximum to zero displacement, and/or hydraulic energy can be recovered during use.

In another broad respect, this invention is a method for manufacturing a hydro-mechanical transmission system, comprising: providing an engine having a drive shaft that extends into and supplies power to a gear box having a first and second planetary gear set, wherein the first and second planetary gear set includes coupled suns with a first ring gear fixed and a carrier coupled to the drive shaft through a double clutch, providing a hydraulic pump driven by the engine and hydraulically coupled to a hydraulic motor, providing a low pressure accumulator coupled to the motor and the pump, providing a high pressure accumulator coupled to the motor and the pump, wherein the hydraulic motor couples to the suns, wherein the engine drives the carrier of the second planetary gear set with the ring of the second planetary gear set coupled to the drive shaft through a double clutch.

In another broad respect, this invention is a method for powering a vehicle, comprising: using a hydro-mechanical transmission system to power the wheels of a vehicle, wherein the hydro-mechanical transmission system comprises an engine having a drive shaft that extends into and supplies power to a gear box having a first and second planetary gear set, wherein the first and second planetary gear set includes coupled suns with a first ring gear fixed and a carrier coupled to the drive shaft through a double clutch, a hydraulic pump driven by the engine and hydraulically coupled to a hydraulic motor, a low pressure accumulator coupled to the motor and the pump, a high pressure accumulator coupled to the motor and the pump, wherein the hydraulic motor couples to the suns, wherein the engine drives the carrier of the second planetary gear set with the ring of the second planetary gear set coupled to the drive shaft through a double clutch.

In another broad respect, this invention is a method for powering a vehicle comprising employing hydro-mechanical transmission system that comprises a hydraulic motor to power a drive shaft without use of power from an engine until reaching a synchronous shift condition, wherein a hydraulic pump coupled to the engine goes from zero to a displacement sufficient to start the engine; then engaging the engine to power the drive shaft and return the pump to zero displacement, wherein the hydraulic motor speed goes to zero. In this method, the hydro-mechanical system can comprise an engine having a drive shaft that extends into and supplies power to a gear box having a first and second planetary gear set, wherein the first and second planetary gear set includes coupled suns with a first ring gear fixed and a carrier coupled to the drive shaft through a double clutch, a hydraulic pump driven by the engine and hydraulically coupled to a hydraulic motor, a low pressure accumulator coupled to the motor and the pump, a high pressure accumulator coupled to the motor and the pump, wherein the hydraulic motor couples to the suns, wherein the engine drives the carrier of the second planetary gear set with the ring of the second planetary gear set coupled to the drive shaft through a double clutch. In addition embodiments, the first and second planetary gear set includes gear ratios that are configured to provide synchronized shifting when the pump to motor displacement ratio is equal the displacement ratio when the pump is at maximum displacement and the motor is at minimum displacement; the system is adapted to provide recovery of brake energy in first gear by taking the pump to zero displacement and taking the motor over center to pump fluid from the low pressure accumulator into the high pressure accumulator; the system is adapted to recover brake energy in second gear by taking the pump and motor over center to pump fluid from the low pressure accumulator into the high pressure accumulator; the system is adapted to provide acceleration by displacing the motor to provide motive torque; and/or the system is adapted to start the engine using the hydraulic pump.

Advantageously, the transmission of this invention allows two or more gear ratios to be employed and allows synchronized shifting between gear ratios while at the same time allowing for kinetic energy recovery. Likewise, this invention allows for the ability to provide hydraulic starting.

This invention provides a number of advantages including but not limited to the ability to obtain a synchronous shift between first and second gear, the ability to recover energy via hydraulics in both first gear and second gear, the ability to reuse recovered energy for launch, the ability to obtain direct mechanical drive for cruise operation, the ability to obtain over-drive operation when needed, and the ability to provide hydraulic starting. This invention provides synchronous shifting without a change in engine speed and no vibration, jerk, or the like when changing gears.

DESCRIPTION OF THE INVENTION

The inventors have recognized that hybrid hydraulics offers increased power density over hybrid electric transmissions.

The transmission of this invention relates to a hydro-mechanical transmission that allows two or more gear ratios to be employed and allowing synchronized shifting between gear ratios while at the same time allowing for kinetic energy recovery.

Figure 1:
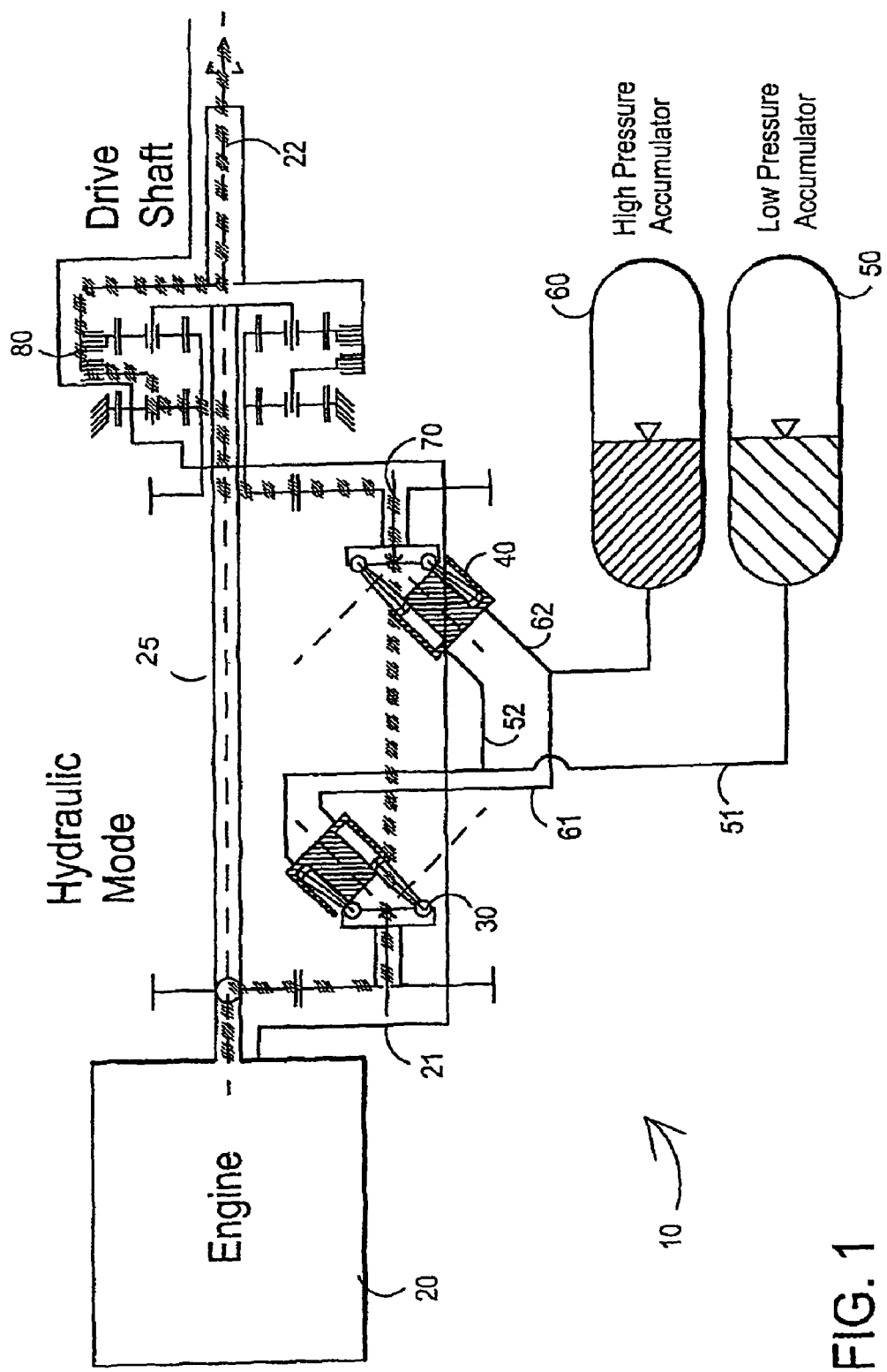
FIG. 1 illustrates a representative hydro-mechanical transmission of this invention in hydraulic mode.

FIG. 1 shows a basic layout of a representative transmission of this invention. In FIG. 1, the system 10 includes a hydraulic pump 30 that is driven by the engine 20 that connects to a pump shaft 21. The hydraulic pump, drive shaft, and pump shaft can be of any conventional design used in such environments that have been adapted to work together in the context of this invention. Hydraulic pumps are also referred to, for example, as variable displacement hydraulic pumps and the like. The system 10 also includes a hydraulic motor 40 that connects to the drive shaft 22 through the two-speed gear box. The hydraulic motor can be the same device as the hydraulic pump 30 except operated in motor mode rather than pump mode. Likewise, the hydraulic pump can also function as a motor if configured to do so. The hydraulic pump 30 also connects to both a low pressure accumulator 50 via line 51 and high pressure accumulator 60 via line 61. Low pressure accumulator also connects to hydraulic motor 40 via line 52. High pressure accumulator 60 also connects to hydraulic motor 40 via line 62.

The accumulators function to store energy from the engine as well as to recover energy normally lost to braking. Thus, energy from the pump when it goes over-center, for example, is recovered by the high pressure accumulator. The kinetic energy stored by the high pressure accumulator is used to provide energy for acceleration. In addition, energy can be stored in the high pressure accumulator when the motor is over center so that energy is backed into the accumulator.

Referring again to FIG. 1, dotted line 70 shows the power path of the transmission in first gear. Power supplied by the engine 20 to the pump shaft 21 is converted to hydraulic power by the pump which is then converted by the hydraulic motor to mechanical power which is then supplied to shaft 22 through the first gear planetary gear set, with output from the clutch 80 being used to power the drive shaft 22. The planetary gear sets include suns that are coupled together hard and are driven by the motor 40. In first gear, the system is designed to be a hydraulic transmission driving into a planetary gearbox to effect a speed reduction and torque increase. The motor output shaft is coupled into the sun of the first planetary gear drive and the output is the carrier with the ring gear being locked to ground. In first gear, high pressure hydraulic fluid from the accumulator can be used to power the hydraulic motor if the pump is at low displacement.

In first gear it is possible to utilize accumulators to allow vehicle kinetic energy to be recovered as hydraulic energy during vehicle deceleration. In this case, the motor becomes a pump by going over center and the pump is set to zero displacement. Vehicle speed causes the motor to take fluid from the low pressure accumulator and pump it into the high pressure accumulator. This accumulation of high pressure fluid can then be used to accelerate the vehicle when the motor is returned to the normal motor position.

Additional speed ratios could be provided as an extension of the two speed gearbox depicted in FIG. 1.

Figure 2:
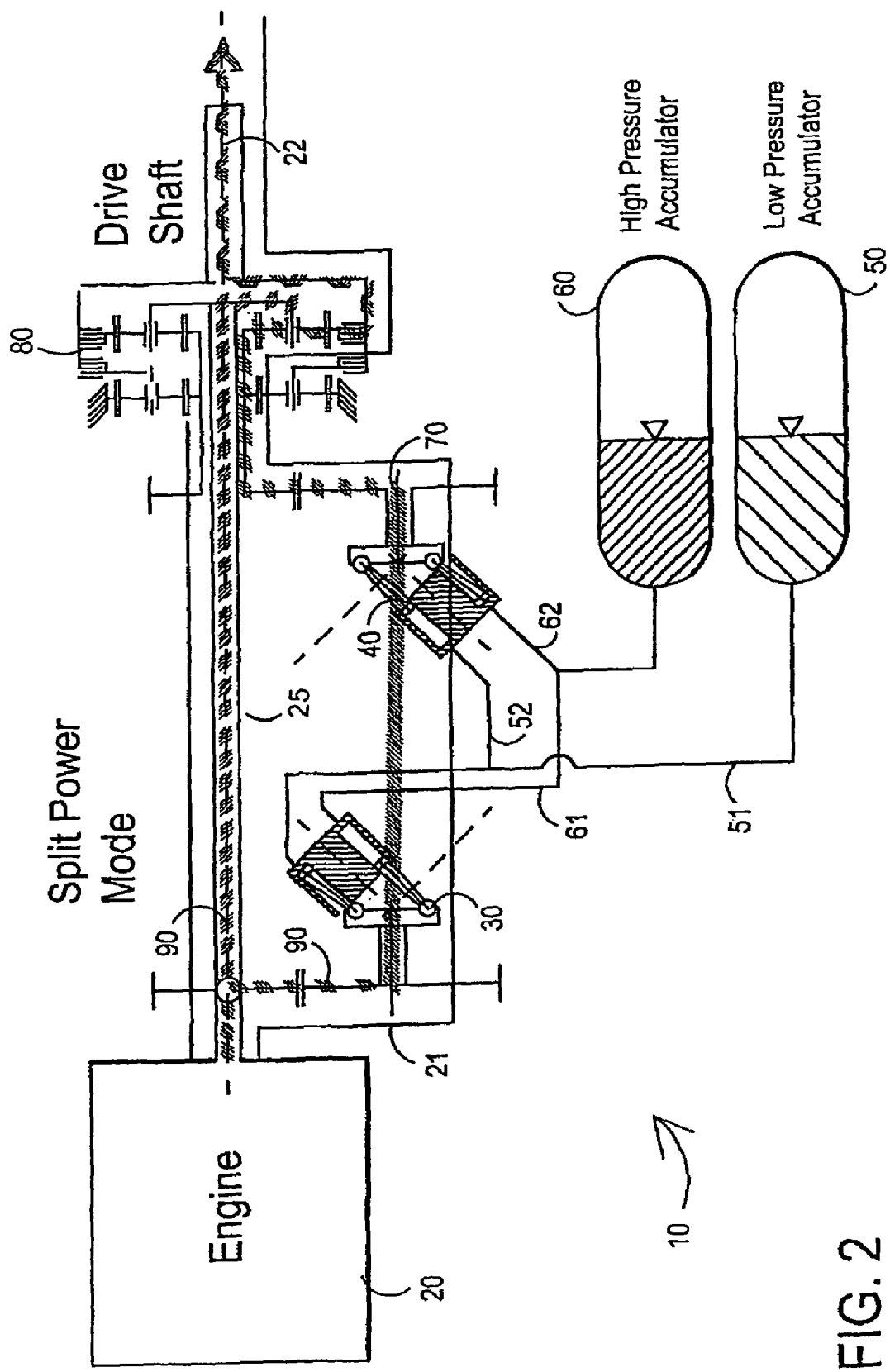
FIG. 2 illustrates a representative hydro-mechanical transmission of this invention in split power mode.

Referring now to FIG. 2, the system in second gear is depicted. In this configuration, the hydraulic motor 40 is coupled to the sun of the second gear planetary drive. However, the engine 20 is coupled to the planet carrier and the ring gear is the output from second gear. Dotted line 90 depicts the power path in second gear. In this configuration, such as described below with respect to FIG. 3, split power mode can be established such that power from the engine 20 provides all the power to drive the shaft 22 through first shaft 25, with the motor speed going to zero as the pump goes to zero displacement.

It is possible to arrange the ratios of the two speed transmission such that there can be a synchronous shift from first gear to second gear. This is advantageous because it allows continuous power flow from the transmission.

In second gear, hydraulic pressure supplied by the high pressure accumulator can also be used to power the motor if the pump is at low displacement, and it is possible to recover vehicle kinetic energy in second gear, but in this case both the pump and the motor must be used because of the way power is split to propel the vehicle. In second gear both the pump and motor must go over center in order for them to generate negative torque in the transmission to decelerate the vehicle. The negative torque of the hydraulic motor is proportional to the displacement of the motor and the pressure in the accumulator.

During deceleration, the motor typically moves fluid from the low pressure accumulator 50 to the high pressure accumulator 60.

Figure 3:
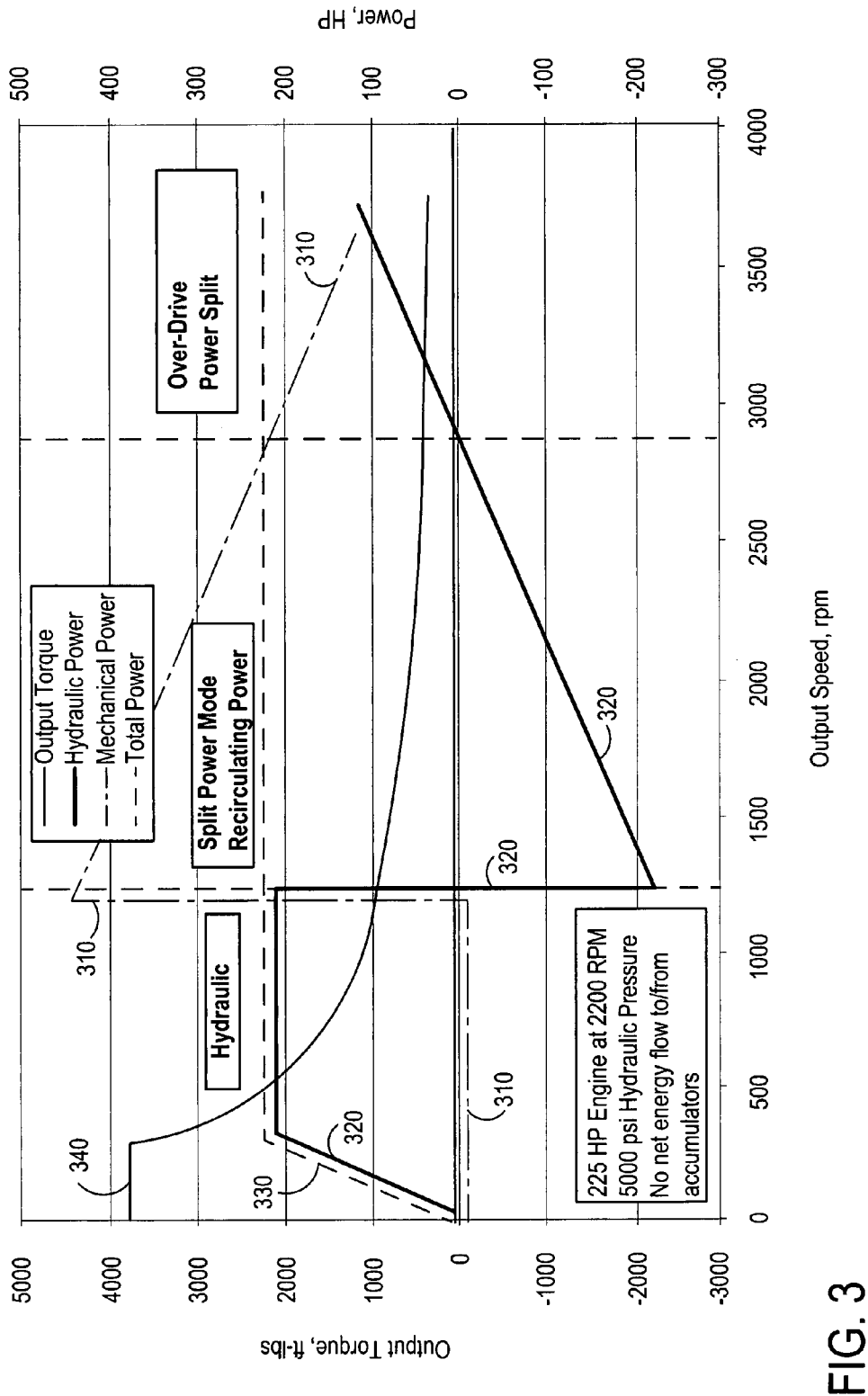
FIG. 3 shows a representative block diagram of output torque/output speed/power for a hydro-mechanical transmission of this invention.

FIG. 3 illustrates a possible torque-speed relationship that can be developed using the transmission configuration of this invention. In this illustration, a 225 horsepower engine at 2200 rpm and 5000 psi of hydraulic pressure is presented, with no net energy flow to or from the accumulators. In FIG. 3, the pump displacement is 7.14 cubic inch per revolution and the motor displacement is 14.3 cubic inch per revolution. The first and second gear ratios are each 4:1.

In first gear, the maximum output torque is equal to the torque produced by the motor at maximum displacement and pressure (14.3 cubic inch per revolution and 5,000 psi) times the first gear ratio. Thus the maximum torque is approximately 3,800 ft-lb. During acceleration, the speed of the transmission would increase at this torque level as the engine speed is increased to its maximum value and the pump reaches maximum displacement, this would normally coincide with maximum engine power being produced and transmitted from the transmission. Further speed increases are accomplished by decreasing the motor displacement which increases motor speed. This is shown in FIG. 3, and increased motor output speed continues until the motor output speed causes the second gear ring speed to be equal to the first gear carrier speed. At this condition, synchronous shifting is possible. Shifting is accomplished by releasing the pressure of the first gear clutch and applying pressure of the second gear clutch. Alternative clutches such as dog clutches could be used to engage first or second gears.

When this shift is accomplished, the power through the hydraulic drive is reversed, as is shown in FIG. 3. This is a normal result of the synchronous shifting of an input coupled two-speed gearbox. Further increases in transmission output speed in second gear occurs by reducing the pump displacement to zero while maintaining the motor displacement at a constant setting, which for this example configuration would be approximately 25 percent of full displacement. When the pump displacement is at zero, the motor speed is also zero and there is no power transferred by the hydraulic drive. All the power from the engine is being transmitted mechanically through the transmission. This is thought to be the most efficient cruise operating condition for the transmission. The ratio of maximum torque to cruise torque is estimated currently to be 9.3 for this configuration, which is quite good for a variable speed transmission.

Additional transmission output speed is possible for this transmission, however, if the negative motor speed is provided. This can be most easily accomplished by causing the pump to go over center toward its maximum displacement. This is the over-drive condition, region 3 of FIG. 3.

The process has been generally described in terms of the maximum engine power. At lower power levels the shifting of the transmission will occur at the same ratio of motor speed to pump speed if the displacement ratio between the pump and the motor remains the same throughout the range of output speeds, but the actual displacements of the pump and motor are lower to produce a correspondingly lower torque. The desired displacement is determined from the relationship: torque=displacement×pressure differential. The pressure differential is the difference between the high pressure and low pressure accumulators at their given state of charge.

In addition, this configuration has been described in terms of the process and system operating generically with no brake energy recovery or with no energy reuse, or in other words, there is no flow in or out of the accumulators. To utilize the energy storage and recovery feature, the displacement ratio of the pump and the motor are modified. During acceleration or positive torque conditions, the displacement ratios can be adjusted to either use energy from the accumulator or to add excess engine energy to the accumulator. During deceleration, energy is recovered by operating the motor in an over-center, or negative displacement condition. In gear two, during deceleration, the pump is also operated over-center. The displacement ratio of the pump and motor and the magnitude of their displacements are set such that the desired level of negative torque is achieved. While braking in gear 1, the pump is set to zero displacement and the motor displacement is set to provide the desired braking torque.

Another feature of the transmission of this invention is the ability to use the pump as a motor and start the engine with energy from the accumulator. This allows the engine to be turned off during idle periods to conserve fuel and then be restarted hydraulically more frequently than would be acceptable with a conventional electric starter.

Referring to FIG. 3, in Condition 1, the system realizes an increase of from 0 to about 1250 rpm in output speed, with the initial total power 330 being 0 horsepower (hp), and with both the starting mechanical power 310 and hydraulic power 320 being 0 hp. As the output hydraulic power source 320 goes from 0 to 225 hp, the total power 330 also increases from 0 to 225 hp. The output torque rises from 0 to about 3800 ft-lbs at 0 rpm and remains constant to about 300 rpm. The rise in output power occurs as the speed goes from 0 to about 300 rpm, during which the hydraulic power and the total power are equal. Hydraulic power is the sole source of energy in Condition 1. As the output torque 340 decreases by decreasing the displacement of the motor, the power remains constant as the output speed increases. During Condition 1, the pump goes from zero to maximum and then the motor goes from maximum to minimum displacement.

In Condition 2, which may be referred to as split power mode using recirculating power, there is a synchronous shift. Now, mechanical power 310 increases substantially from 0 to about 450 hp. Simultaneously, the hydraulic power 320 goes to −225 hp as the power flow through the hydraulic motor and pump is reversed. Note that the total power 330 remains constant throughout Condition 2. The output torque 340 decreases during the course of Condition 2. As the pump displacement is reduced to zero, the hydraulic power 320 rises to zero hp at the end of Condition 2. Likewise, as the pump displacement is reduced and less power is transmitted hydraulically, the mechanical power 310 decreases to about 225 hp. In Condition 2, the output speed goes from 1250 rpm to about 2800 rpm. Condition 2 shows a cruise condition in which all power derives from mechanical power.

Next, in Condition 3, the system goes into an over-drive condition using the power split. Both hydraulic power 320 and mechanical power 310 are employed. As mechanical power 310 decreases from about 225 hp to about 110 hp, the hydraulic power increases from 0 to about 110 hp. The total power 330 remains constant at 225 hp. In Condition 3 the output torque continues to decrease as the output speed increases from about 2800 rpm to about 3750 rpm. At the conclusion of Condition 3 the pump is over-center, which causes a rotation of the motor in the other direction.

Further modifications and alternative embodiments of this invention will be apparent to those skilled in the art in view of this description. Accordingly, this description is to be construed as illustrative for the purpose of teaching those skilled in the art the manner of carrying out the invention. It is to be understood that the forms of the invention herein shown and described are to be taken as illustrative embodiments. Equivalent elements or materials may be substituted for those illustrated and described herein, and certain features of the invention may be utilized independently of the use of other features, all as would be apparent to one skilled in the art after having the benefit of this description of the invention.

What is claimed is:

1. A hydro-mechanical transmission system, comprising:
   an engine having a first shaft that extends into and supplies power to a gear box having a first and second planetary gear sets, wherein the first and second planetary gear sets include coupled suns with a first ring gear fixed and the first gear carrier coupled to a drive shaft through a clutch,
   a hydraulic pump driven by the engine through a pump shaft and hydraulically coupled to a hydraulic motor,
   a low pressure accumulator coupled to the motor and the pump,
   a high pressure accumulator coupled to the motor and the pump,
   wherein the hydraulic motor is coupled to the suns of both the first and second gears of the planetary gear sets, wherein the engine drives the carrier of the second planetary gear set with the ring of the second planetary gear set coupled to the drive shaft through the clutch.

2. The system of claim 1, wherein the first and second planetary gear sets includes gear ratios that are configured to provide synchronized shifting when the pump to motor displacement ratio is equal to the displacement ratio that exists when the pump is at maximum displacement and the motor is at minimum displacement.

3. The system of claim 1, wherein the system is adapted to provide recovery of brake energy in first gear by taking the pump to zero displacement and taking the motor over center to pump fluid from the low pressure accumulator into the high pressure accumulator.

4. The system of claim 1, wherein the system is adapted to recover brake energy in second gear by taking the pump and motor over center to pump fluid from the low pressure accumulator into the high pressure accumulator.

5. The system of claim 1, wherein the system is adapted to provide acceleration by displacing the motor to provide motive torque.

6. The system of claim 1, wherein the system is adapted to start the engine using the hydraulic pump.

7. A method for manufacturing a hydro-mechanical transmission system, comprising: providing an engine having a first shaft that extends into and supplies power to a gear box having a first and second planetary gear sets, wherein the first and second planetary gear sets include coupled suns with a first ring gear fixed and the first gear carrier coupled to a drive shaft through a clutch, providing a hydraulic pump driven by the engine through a pump shaft and hydraulically coupled to a hydraulic motor, providing a low pressure accumulator coupled to the motor and the pump, providing a high pressure accumulator coupled to the motor and the pump, wherein the hydraulic motor is coupled to the suns of both the first and second gears of the planetary gear sets, wherein the engine drives the carrier of the second planetary gear set with the ring of the second planetary gear set coupled to the drive shaft through the clutch.

8. The method of claim 7, wherein the first and second planetary gear sets includes gear ratios that are configured to provide synchronized shifting when the pump to motor displacement ratio is equal to the displacement ratio that exists when the pump is at maximum displacement and the motor is at minimum displacement.

9. The method of claim 7, wherein the system is adapted to provide recovery of brake energy in first gear by taking the pump to zero displacement and taking the motor over center to pump fluid from the low pressure accumulator into the high pressure accumulator.

10. The method of claim 7, wherein the system is adapted to recover brake energy in second gear by taking the pump and motor over center to pump fluid from the low pressure accumulator into the high pressure accumulator.

11. The method of claim 7, wherein the system is adapted to provide acceleration by displacing the motor to provide motive torque.

12. The method of claim 7, wherein the system is adapted to start the engine using the hydraulic pump.

13. A method for powering a vehicle, comprising: using a hydro-mechanical transmission system to power the wheels of a vehicle, wherein the hydro-mechanical transmission system comprises
an engine having a first shaft that extends into and supplies power to a gear box having a first and second planetary gear sets, wherein the first and second planetary gear set includes coupled suns with a first ring gear fixed and a carrier coupled to a drive shaft through a clutch,
a hydraulic pump driven by the engine through a pump shaft and hydraulically coupled to a hydraulic motor,
a low pressure accumulator coupled to the motor and the pump,
a high pressure accumulator coupled to the motor and the pump,
wherein the hydraulic motor is coupled to the suns of both the first and second gears of the planetary gear sets, wherein the engine drives the carrier of the second planetary gear set with the ring of the second planetary gear set coupled to the drive shaft through the clutch.

14. The method of claim 13, wherein the first and second planetary gear sets includes gear ratios that are configured to provide synchronized shifting when the pump to motor displacement ratio is equal to the displacement ratio that exists when the pump is at maximum displacement and the motor is at minimum displacement.

15. The method of claim 13, wherein the system is adapted to provide recovery of brake energy in first gear by taking the pump to zero displacement and taking the motor over center to pump fluid from the low pressure accumulator into the high pressure accumulator.

16. The method of claim 13, wherein the system is adapted to recover brake energy in second gear by taking the pump and motor over center to pump fluid from the low pressure accumulator into the high pressure accumulator.

17. The method of claim 13, wherein the system is adapted to provide acceleration by displacing the motor to provide motive torque.

18. The method of claim 13, wherein the system is adapted to start the engine using the hydraulic pump.

* * * * *